US008844198B2

(12) United States Patent
Raisoni et al.

(10) Patent No.: US 8,844,198 B2
(45) Date of Patent: Sep. 30, 2014

(54) MULTILAYER WINDOW LIFT RAIL, AND APPARATUS AND METHOD FOR MAKING THE SAME

(75) Inventors: Jayprakash U. Raisoni, Rochester, MI (US); Suresh D. Shah, Troy, MI (US); Geoff Barr, Troy, MI (US)

(73) Assignee: Inteva Products, LLC, Troy, MI (US)

( * ) Notice: Subject to any disclaimer, the term of this patent is extended or adjusted under 35 U.S.C. 154(b) by 562 days.

(21) Appl. No.: 12/550,095

(22) Filed: Aug. 28, 2009

(65) Prior Publication Data

US 2011/0047878 A1   Mar. 3, 2011

(51) Int. Cl.
*E05F 11/48* (2006.01)
*E05D 15/16* (2006.01)
*B29C 45/16* (2006.01)
*E05F 11/38* (2006.01)

(52) U.S. Cl.
CPC .......... *B29C 45/1635* (2013.01); *E05D 15/165* (2013.01); *E05Y 2800/676* (2013.01); *E05Y 2800/43* (2013.01); *E05Y 2800/46* (2013.01); *E05F 11/382* (2013.01); *E05Y 2900/55* (2013.01)
USPC .................. 49/352; 49/502; 49/348; 49/349; 49/360; 264/328.8; 264/255

(58) Field of Classification Search
USPC .................. 49/502, 348, 349, 352, 360, 324; 264/254; 425/130
See application file for complete search history.

(56) References Cited

U.S. PATENT DOCUMENTS

| | | | | |
|---|---|---|---|---|
| 4,970,911 A | * | 11/1990 | Ujihara et al. | 74/501.5 R |
| 5,033,233 A | * | 7/1991 | Suzumura | 49/352 |
| 5,333,411 A | * | 8/1994 | Tschirschwitz et al. | 49/352 |
| 5,385,061 A | | 1/1995 | Moy et al. | |
| 5,916,075 A | * | 6/1999 | Tanaka et al. | 49/441 |
| 6,151,833 A | | 11/2000 | Gmurowski et al. | |

(Continued)

FOREIGN PATENT DOCUMENTS

| | | |
|---|---|---|
| DE | 3741615 A1 | 6/1999 |
| JP | 2006-32133 | 2/2006 |
| JP | 2008-307771 A | 12/2008 |
| WO | WO2006045720 A1 | 5/2006 |

OTHER PUBLICATIONS

International Search Report dated Apr. 28, 2011 for International Application No. PCT/US2010/046610.

(Continued)

*Primary Examiner* — Katherine Mitchell
*Assistant Examiner* — Marcus Menezes
(74) *Attorney, Agent, or Firm* — Cantor Colburn LLP

(57) ABSTRACT

A multilayer window guiderail is disclosed. The window guiderail includes a rail portion having an outer edge, a rail surface and an opposing rear surface. The rail portion includes a core and an integral rail cover layer disposed on the core. The core includes a first polymer material and the rail cover layer includes a second polymer material. An apparatus for making a multilayer guiderail includes a plurality of die portions having respective cavity portions. The cavity portions are configured to define a die cavity having the shape of the guiderail, at least one of the die portions being a slidable die portion and at least one of the die portions being a fixed die portion. The parting surface of the slidable die portion is configured for sliding translation of its parting surface over the parting surface of the fixed die portion along a translation path.

11 Claims, 10 Drawing Sheets

(56) References Cited

U.S. PATENT DOCUMENTS

| | | |
|---|---|---|
| 6,282,791 B1 * | 9/2001 | Patelczyk ................. 29/897.2 |
| 6,425,208 B1 * | 7/2002 | Klueger et al. ............. 49/502 |
| 6,516,493 B1 * | 2/2003 | Seliger et al. ............ 16/96 R |
| 6,758,013 B2 | 7/2004 | Staser et al. |
| 2003/0012837 A1 | 1/2003 | Siano |
| 2006/0005469 A1 * | 1/2006 | Bara et al. ................... 49/440 |

OTHER PUBLICATIONS

Written Opinion dated Apr. 28, 2011 for International Application No. PCT/US2010/046610.

\* cited by examiner

MULTILAYER WINDOW LIFT RAIL, AND APPARATUS AND METHOD FOR MAKING THE SAME

BACKGROUND OF THE INVENTION

This invention relates generally to window lifts or regulators, and more particularly to guiderails for the same and an apparatus and method for their manufacture.

Automotive vehicles have movable windows that may be opened and closed via window lift or regulator assemblies that are often supplied as modules for assembly to the door. These assemblies may be either manually operated or power controlled. Such regulator assemblies can have tape drive or cable drive mechanisms, each having many similar components.

For example, a conventional moveable window glass of an automotive door is slidably supported at its front and back ends by guides. The window glass is raised and lowered by a window regulator that fixed to the door and includes a bracket assembly that is secured to the lower end of the window glass. The bracket assembly runs on a vertical guiderail that is supported by and housed within the automotive door and that frequently includes a guide channel or rail that includes the surface over which the bracket moves and with which the bracket is in contact during operation of the regulator assembly. The bracket assembly is moved vertically on the guiderail by a flexible multistrand cable, mechanical arms, rack and pinion or planetary mechanisms or flexible tape. The ends of the cable or tape are attached to the bracket assembly with the cable or tape typically trained over three rollers so as to run in a reversible triangular loop. Rollers include two guide rollers at either end of the guiderail. Typically the upper roller is part of an upper roller assembly at the top of the guiderail and the lower roller is part of the lower roller assembly at the bottom of the guiderail. The third roller is a drive roller that is supported in a housing, and the drive roller is driven by an electric motor. The roller axis of the three rollers defines a triangle. The cable or flexible tape runs through the first conduit between the driver roller and the upper roller. Another portion of the cable or flexible tape runs in a second conduit that extends between the drive roller and the lower roller. The conduits are generally fixed to the upper roller, lower roller, drive roller, or a combination of them, with suitable base or bracket, and in the case of upper or lower rollers may also include a pin for attachment of the rollers. The conduits, bases or guiderail, or a combination thereof, may also be fixed to the inner door frame. Respective ends of the cable or flexible tape are attached to opposite sides of the bracket. Rotating the drive motor and drive pulley in a first direction of rotation will cause the bracket to move along the guiderail upwardly to the upper roller and associated stop. Reversing the direction of the drive motor and drive pulley will cause the bracket to slide along the guiderail in the opposite direction toward the lower roller and an associated bracket stop. The guiderails used in such regulator assemblies have frequently been stamped metal parts, and may be open on one or both ends, but frequently are closed on both ends, such that the closed ends provide an end stop for travel of the bracket as it is translated up and down in the channel.

Injection molding has also been proposed for use in the manufacture of guiderails; however, the necessary structural property of the guiderails generally dictates that injection molded parts be made from a filled plastic, including filled engineering plastic, such as a filled engineering thermoplastic. The filled plastics, such as those incorporating various strengthening particles or fibers are more difficult to feed into an injection molded part, and generally require higher pressures to fill the mold in a given configuration than the use of an unfilled plastic in the same mold configuration. The difficulty described coupled with the fact that the guiderails by their design are generally long thin-sectioned parts makes the design of suitable injection molds difficult for these parts. Still further, in addition to the guiderails having design requirements that require the use of filled plastics, it is also desirable to achieve a low co-efficient of sliding friction on the portion of the guiderail that acts as the rail and engages with the bracket that is translated within the channel or conduit formed in the rail. Generally, this has required the incorporation of low friction coefficient constituents, such as fluoropolymers, in the filled plastic, which are dispersed throughout the filled plastic in order to achieve a suitably low friction coefficient on the affected guiderail surfaces. The incorporation of constituents which provide the desired low coefficient of friction vary, since fluoropolymers and other low coefficient of friction constituents are generally expensive, and have a tendency to significantly increase the cost of such parts. Given the constraints described above related to the use of injection molding and the manufacture of window regulator guiderails, the use of injection molding to produce such parts has been quite limited.

Thus, there remains a need for improved polymer guiderails for various window regulator designs, as well as improved processes to enable their manufacture from various polymer materials.

SUMMARY OF THE INVENTION

In accordance with an exemplary embodiment, a multilayer window guiderail. The window includes a rail portion having an outer edge, a rail surface and an opposing rear surface. The rail portion includes a core and an integral rail cover layer disposed on the core. The core includes a first polymer material and the rail cover layer includes a second polymer material.

In accordance with another exemplary embodiment, a method of forming a multilayer window rail comprising a rail portion having an outer edge, a rail surface and an opposing rear surface, the rail portion comprising a core and an integral rail cover layer disposed on the core, the rail cover layer comprising a first polymer material and the core comprising a second polymer material, is disclosed. The method includes providing a plurality of die portions having respective cavity portions, the cavity portions configured to define a die cavity having the shape of the guiderail, at least one of the die portions being a slidable die portion and at least one of the die portions being a fixed die portion, the slidable die portion having a parting surface configured for slidable, sealed engagement with a parting surface of the fixed die portion, wherein the parting surface of the slidable die portion is configured for sliding translation of its parting surface over the parting surface of the fixed die portion along a translation path, one of the fixed die portion or the slidable die portion configured to receive a first injection nozzle and a second injection nozzle, the first injection nozzle configured for injection of a first precursor polymer, the second injection nozzle configured for injection of a second precursor polymer, and wherein the first nozzle is spaced from the second nozzle along the translation path. The method also includes injecting a first precursor of the first polymer material into the die cavity. The method also includes translating the slidable die portion along the translation path while injecting the precursor of the first polymer material, wherein the first precursor polymer forms the rail cover layer. Further, the method also includes injecting a second precursor of the second polymer material into the die cavity while translating the slidable die portion, wherein the second precursor forms the core. Still further, the method also includes continuing the translating until the guiderail is formed.

In yet another exemplary embodiment, an apparatus for forming a multilayer window rail comprising a rail portion having an outer edge, a rail surface and an opposing rear surface, the rail portion comprising a core and an integral rail cover layer disposed on the core, the rail cover layer comprising a first polymer material and the core comprising a second polymer material, is disclosed. The apparatus includes a plurality of die portions having respective cavity portions, the cavity portions configured to define a die cavity having the shape of the guiderail, at least one of the die portions being a slidable die portion and at least one of the die portions being a fixed die portion, the slidable die portion having a parting surface configured for slidable, sealed engagement with a parting surface of the fixed die portion, wherein the parting surface of the slidable die portion is configured for sliding translation of its parting surface over the parting surface of the fixed die portion along a translation path, one of the fixed die portion or the slidable die portion configured to receive a first injection nozzle and a second injection nozzle, the first injection nozzle configured for injection of a first precursor polymer, the second injection nozzle configured for injection of a second precursor polymer, and wherein the first nozzle is spaced from the second nozzle along the translation path.

BRIEF DESCRIPTION OF THE DRAWINGS

Other features, advantages and details appear, by way of example only, in the following description of embodiments, the description referring to the drawings in which.

DETAILED DESCRIPTION

Figure 1:
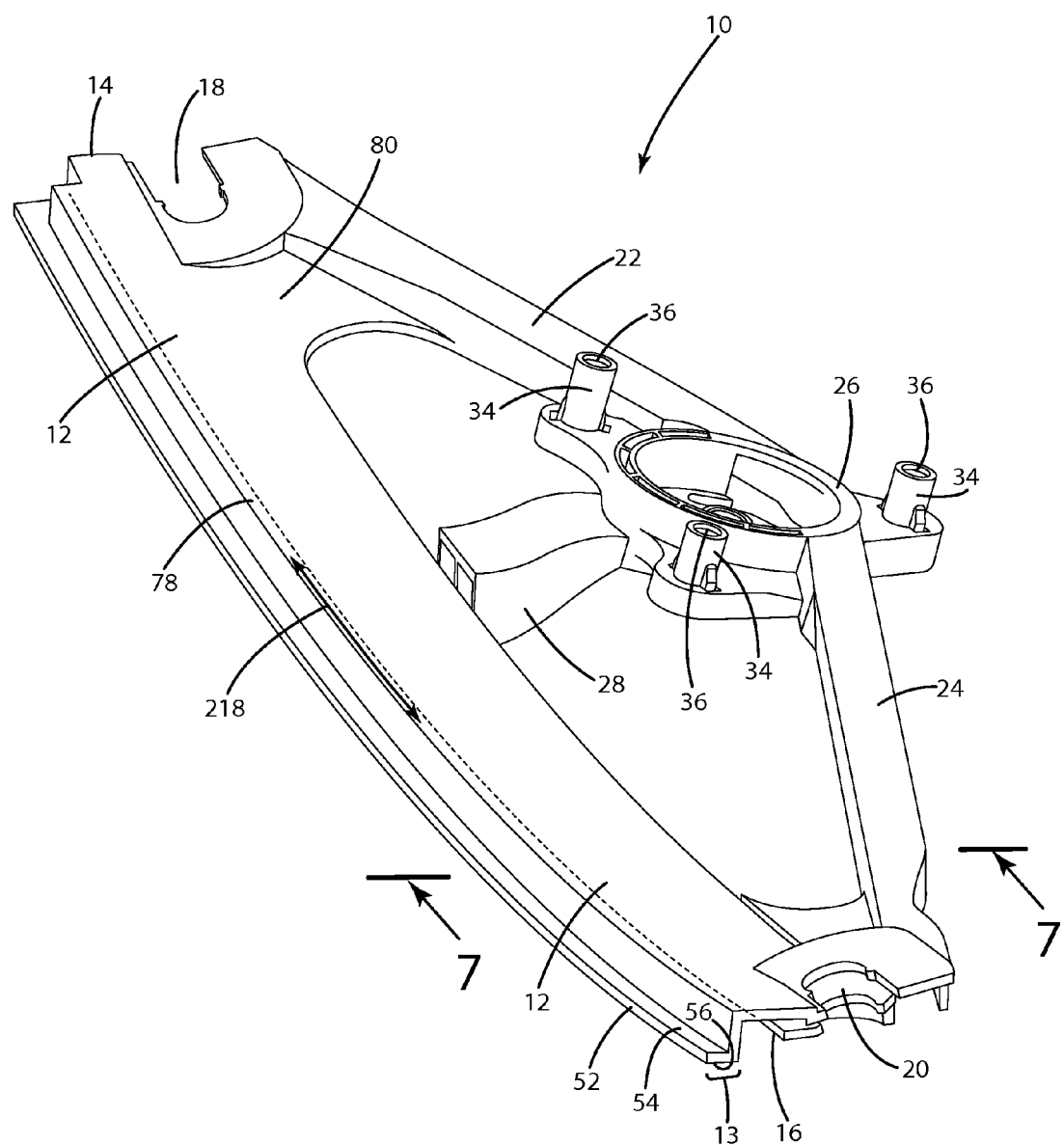
FIG. 1 is a top perspective view of an exemplary embodiment of a window guide rail as disclosed herein.

Exemplary embodiments of a multilayer window guiderail and a method and apparatus for making the same are disclosed. The multilayer guiderail has a rail portion that includes a rail structure proximate an outer edge and an integral rail cover layer disposed on the guiderail structure. The rail portion and rail structure are formed from a first polymer material and the integral rail cover layer includes a second polymer material. The first polymer material may be selected to provide the guiderail with necessary strength and other structural characteristics essential to the guiderail, while the second polymer material may be selected to provide desirable characteristics, such as a low co-efficient of sliding friction, or high wear resistance, or a combination thereof, or other characteristics that differ from those of the first polymer material. A rail portion and integral rail cover may be formed as an integral structure by injection molding. Further, the novel guiderail structure may also incorporate other desirable features, such as integral conduits for guiding a movable cable or tape used to transfer the motive power for opening and closing the window. It may also include an integral motor mounting bracket used to mount the motor used to provide the motive power for opening and closing the window. The window guiderail and method of making the same are described below.

Referring to FIGS. 1, and 3-5, multilayer window guiderail 10 is illustrated. Window guiderail 10 is configured for use in conjunction with a window regulator (not shown) of the type that may be used with the moveable window glass (not shown) of an automotive door (not shown) as described herein. Window guiderail 10 is configured for sliding movement of a bracket assembly (not shown) as described herein. Guiderail 10 includes a rail portion 12 having an upper end 14 and a lower end 16. Upper end 14 includes a roller slot 18 that is configured to receive an upper roller assembly (not shown). Lower end 16 includes a lower roller slot 20 that is configured to receive a lower roller assembly (not shown). Guiderail 10 also includes an upper arm 22 and a lower arm 24 that are attached to a motor mount 26. A central arm 28 may also be included between rail portion 12 and motor mount 26 to stiffen guiderail 10, particularly upper arm 22 and lower arm 24. Upper arm 22 provides a structural support between upper end 14 of rail portion 12 and motor mount 26. Upper arm 22 also provides a channel or conduit 30 (FIGS. 3 and 5) through which cable or flexible tape (not shown) may be disposed between the drive roller (not shown) and upper roller (not shown). Lower arm 24 also provides lower channel or conduit 32 on an underside thereof that is configured to receive a cable or flexible tape (not shown) that extends between the drive roller (not shown) and lower roller (not shown). The motor mount 26 may include a plurality of integral bushings or bosses 34 on the top surface thereof that are adapted to receive mounting bolts (not shown) for mounting an electric drive motor (not shown) in a plurality of bores 36 that extend therethrough. Motor mount 26 may also include a plurality of radially, inwardly extending protruding ribs 38 that extend from an outer rim 40 to an annular inner ring 42 that surrounds a shaft bore 44 that is configured to receive the drive shaft (not shown) of an electric drive motor (not shown). The central arm 28 may also include one or more stiffening ribs 46 to provide additional strength and rigidity to central arm 28. A plurality of stiffening ribs 48 may also be applied to various portions of the lower surface 50 of guiderail 10 to provide strengthening and stiffening of the guiderail at locations requiring the same, such as upper end 14 and lower end 16.

As illustrated in FIGS. 1, 3-5 and 7C, multilayer window guiderail 10 includes a multilayer rail portion 12. Multilayer rail portion 12 includes a multilayer rail 13 along its outer edge that includes the bearing and sliding surface or surfaces that contact the window bracket assembly (not shown). Multilayer rail 13 includes an outer edge 52, a rail surface 54 and an opposing rear surface 56. Multilayer rail portion 12, and particularly its multilayer rail 13, is the portion of guiderail 10 over which the bracket assembly that secures the lower end of the window glass is translated, as described herein. Multilayer rail portion 12, including multilayer rail 13, has sufficient structural strength to withstand the loads imposed by the bracket, window glass and other portions of the window regulator mechanism, including various static and dynamic tensile, compressive and torsional and combinations thereof associated with bearing and translating the window glass up and down. Multilayer rail portion 12 includes core 58 and integral rail cover layer 60 disposed on the core 58. Core 58 is primarily the load bearing structure within rail portion 12 and multilayer rail 13. Core 58 may be molded from any suitable injection moldable engineering plastic. In an exemplary embodiment, core 58 is a filled polymer. Suitable filled polymers include filled nylon, polypropylene, or polyester. Any suitable filler may be used, including various fiber, flake or particulate fillers, or a combination thereof. Examples of particulate fillers include china clay, glass, ceramic or metal particles, or combinations thereof. Examples of flake fillers include mica, flake glass or polymer flakes, or combinations thereof. Examples of fibrous fillers include various glass, carbon, polymer or ceramic fibers, or combinations thereof. Integral rail cover layer 60 is used as the sliding surface of rail portion 12, and more particularly of multilayer rail 13. Rail cover layer 60 should have a combination of low sliding resistance, i.e., a low coefficient of sliding friction, and high wear resistance. In an exemplary embodiment, integral rail cover layer 60 includes an unfilled polymer. Suitable unfilled polymers include unfilled nylon, polyester or acetal, including a combination of these materials with any compatible injectable polymer material that includes a slip coat agent, including slip coat agents comprising a silicone or a fluoropolymer (e.g., PTFE) and the like. Slip coat agents are friction modifiers that lower the coefficient of friction of the polymers to which they are added. In an exemplary embodiment, core 58 has a first coefficient of friction ($\mu_1$) and the integral rail cover layer 60 has a second coefficient of friction ($\mu_2$), and $\mu_1 > \mu_2$. In another exemplary embodiment, the polymer used for core 58 and the polymer used for integral rail cover layer 60 are different polymers. As used herein different polymers includes the use of the same polymer material with different fillers (e.g., glass-filled nylon and oil-filled nylon), as well as the use of the same polymer material with and without filler materials (e.g., nylon with glass fiber or beads and unfilled nylon), or the same polymers with different amounts of the same filler material (e.g., nylon having 60 volume percent filler and nylon having 10 volume percent filler).

Injection molding of the materials of integral rail cover layer 60 and core 58 described above is generally performed at a high temperature, particularly temperatures above the glass transition ($T_g$) temperature of these materials, and more particularly above the melting temperature of these materials. Under these injection conditions, integral rail cover layer 60 is integrally bonded to the core 58 of rail 13 by the injection of the precursor material used to form the core. The polymer precursor of the polymer used to form rail cover layer 60 is injected into the mold just prior to the injection of the polymer precursor of the polymer used to form core 58. Thus, the material of rail cover layer 60 is still hot and may not have even fully solidified when the material of the core 58 is injected. Without being bond by theory, injection of the precursor material for integral rail cover layer 60 forms a solidified skin as the material strikes the mold walls. Mold walls may be heated or cooled depending on the precursor material employed, and the requirements of any desired polymerization reactions, where heating may be used to promote the polymerization reaction (e.g., thermoset materials), or requirements of any desired phase or state changes (e.g., solidification of thermoplastic materials), where cooling may be used to promote the change. However, despite the solidified skin that is developed at the mold walls, the injected material away from the mold wall may be molten or only partially polymerized. In this environment, subsequent injection of the precursor material for the core 58 is placed in intimate contact with the molten or only partially polymerized precursor material of the integral rail cover layer 60. This intimate contact promotes an integral bond such that the rail cover layer 60 becomes an integral part of core 58, regardless of whether the bond itself is includes a physical bond, chemical bond, or a combination thereof.

As noted, injection molding of the materials of integral rail cover layer 60 and core 58 described above is generally performed at a high temperature, particularly temperatures above the glass transition ($T_g$) temperature of these materials, and more particularly above the melting temperature of these materials. However, due to the nature of the molding process and the movable die employed to progressively fill the die cavity, injection of the materials for integral rail cover layer 60 and core 58 is done at relatively low pressures, much lower than would normally be employed for injection molding. This is due to the fact that the pressure only needs to be sufficient to reach the portion of the mold cavity proximate the molding nozzle, and does not need to be large enough to propel the molding material to the farthest points within the die cavity in a single shot. This is a very advantageous aspect of the invention, since it lessens the design requirements on the dies and associated molding apparatus, thereby lower the cost of these items and the associated amortized capital cost associated with each molded part.

Integral rail cover layer 60 may be located over the entire outer surface of core 58 and rail 13, or just a portion of the outer surface. More particularly, integral rail cover layer 60 may be included on the rail surface 54, the outer edge 52 or the rear surface 56, or a combination thereof. In one embodiment (not shown), integral rail cover layer 60 is included on rail surface 54. In another embodiment, rail cover layer 60 is included on the rail surface 62, the outer edge 52 and the rear surface 56.

Multilayer rail portion 12 and multilayer rail 13 may have any suitable shape, including being flat (not shown). In an exemplary embodiment, multilayer rail portion 12 and rail 13 may include a formed guide channel 68 located on the rail surface 54. Guide channel 68 may be formed into a shape having a stiffening element to stiffen multilayer rail portion 12, such as an orthogonal (in relation to the rail portion) rib. In an exemplary embodiment, formed guide channel 68 is an L-shaped channel formed in the rail surface 54 that includes rail portion 12 and rail 13. Formed guide channel 68 may be used as a channel to house or provide a guide for the window bracket (not shown) that is translated back and forth along guiderail 10.

Figure 6A:
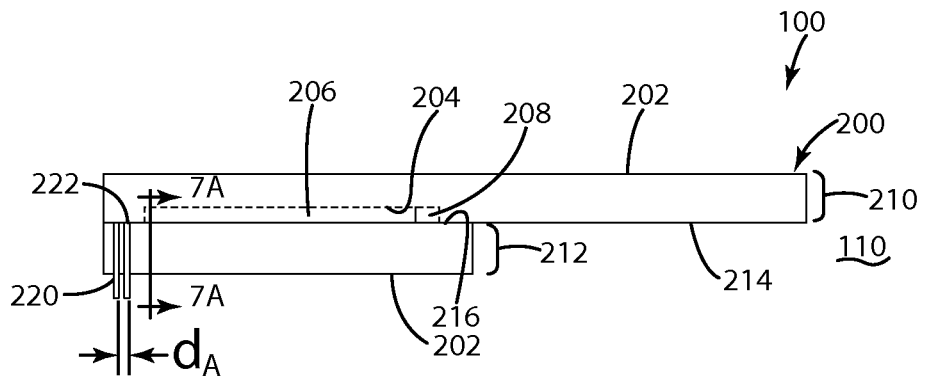
FIGS. 6A-6F are schematic illustrations of an exemplary apparatus and method for making a window guide rail as disclosed herein.
Figure 6B:
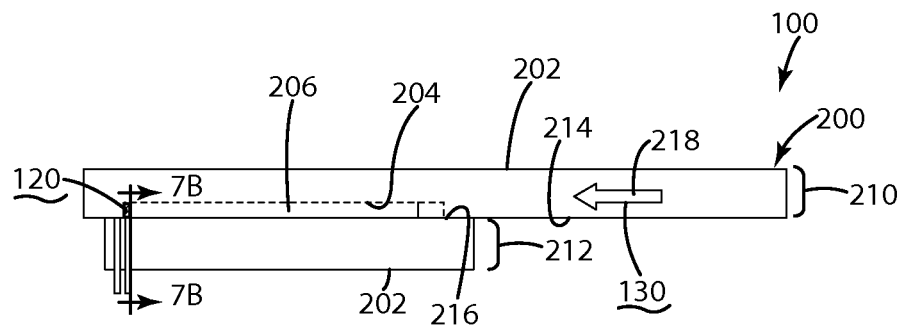
Figure 6C:
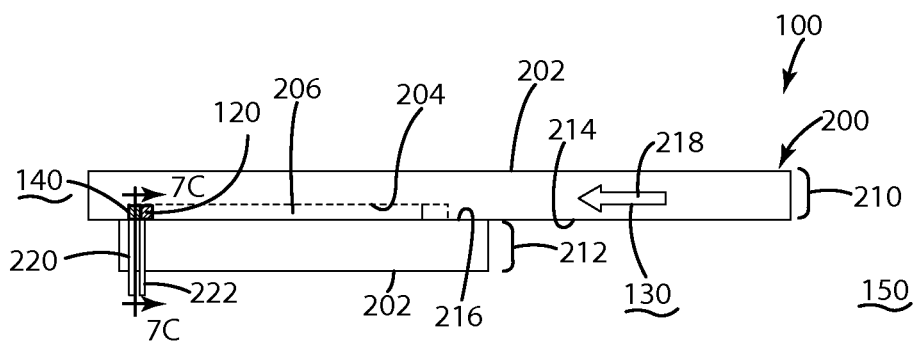
Figure 6D:
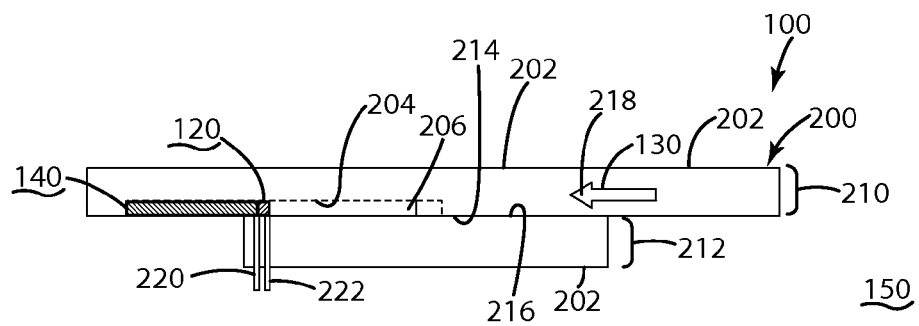
Figure 6E:
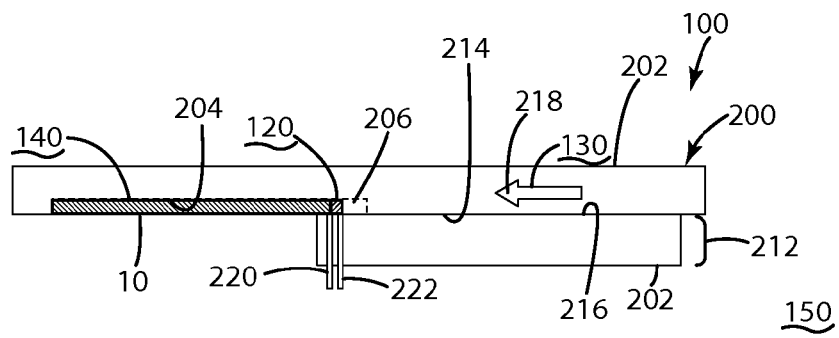
Figure 6F:
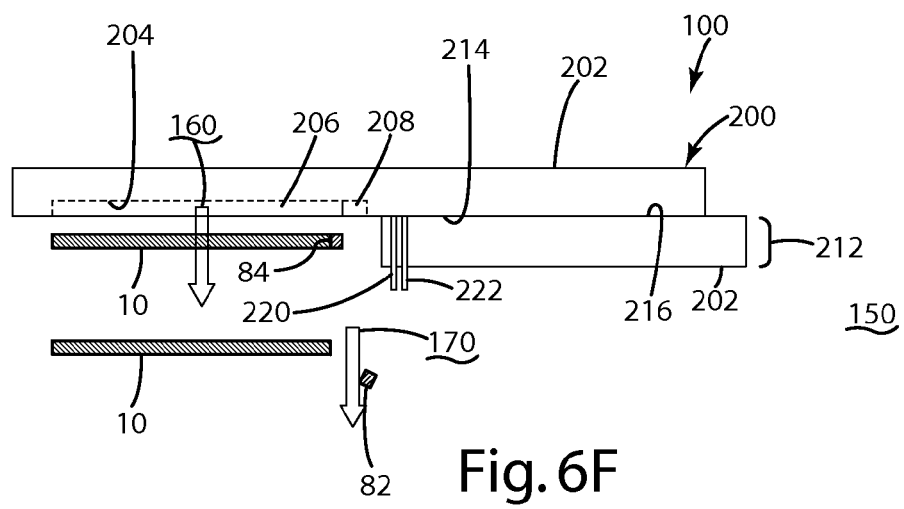
Figure 7A:
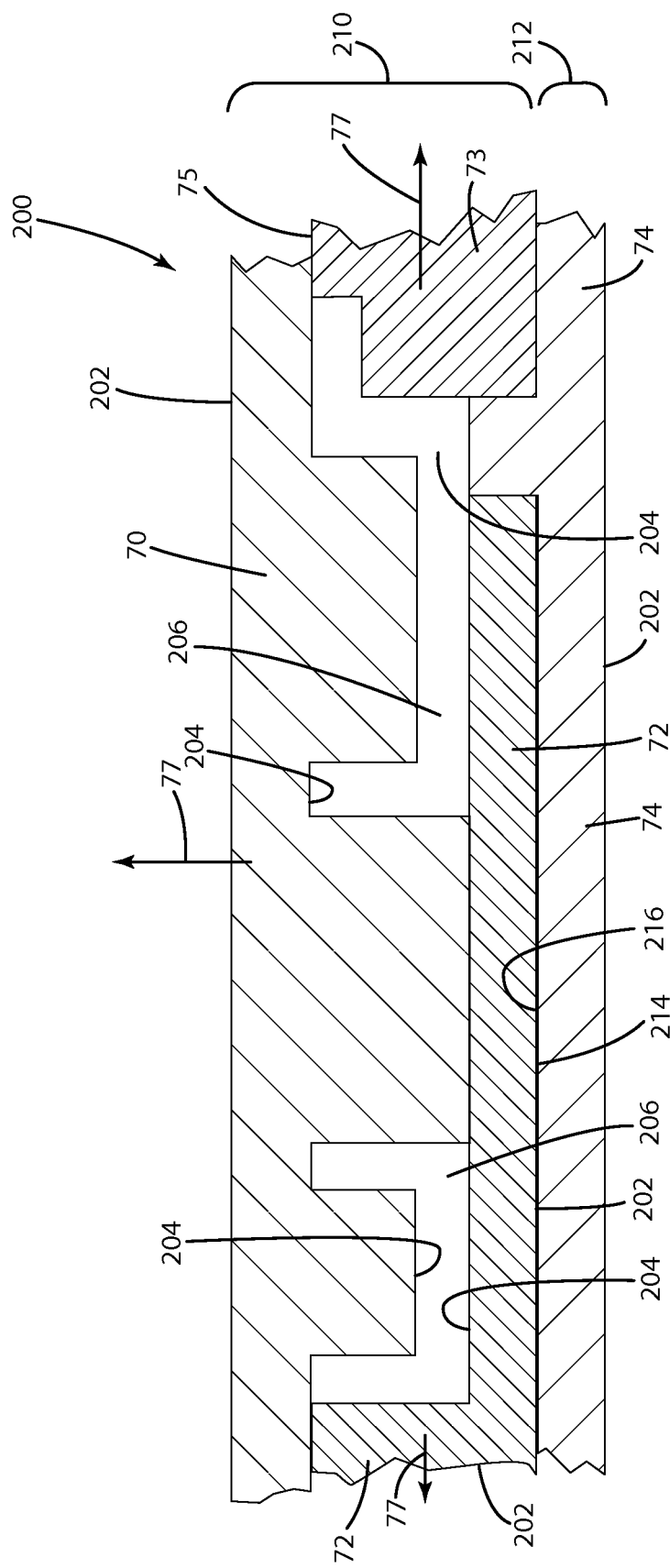
FIGS. 7A-7C are cross-sectional views of the apparatus illustrating the method for making the window guide rail taken along sections 7A-7A, 7B-7B, and 7C-7C in FIGS. 6A-6C, respectively.
Figure 7B:
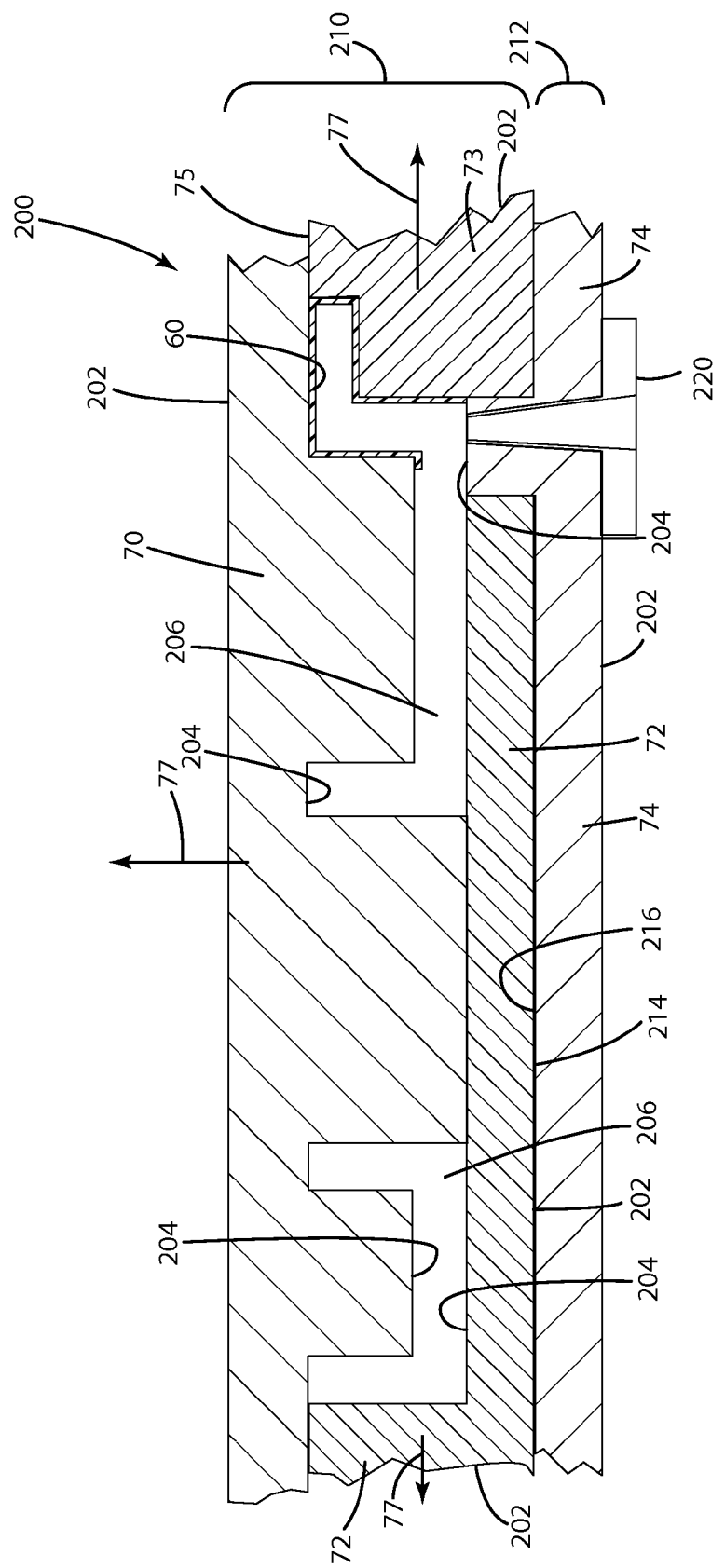
Figure 7C:
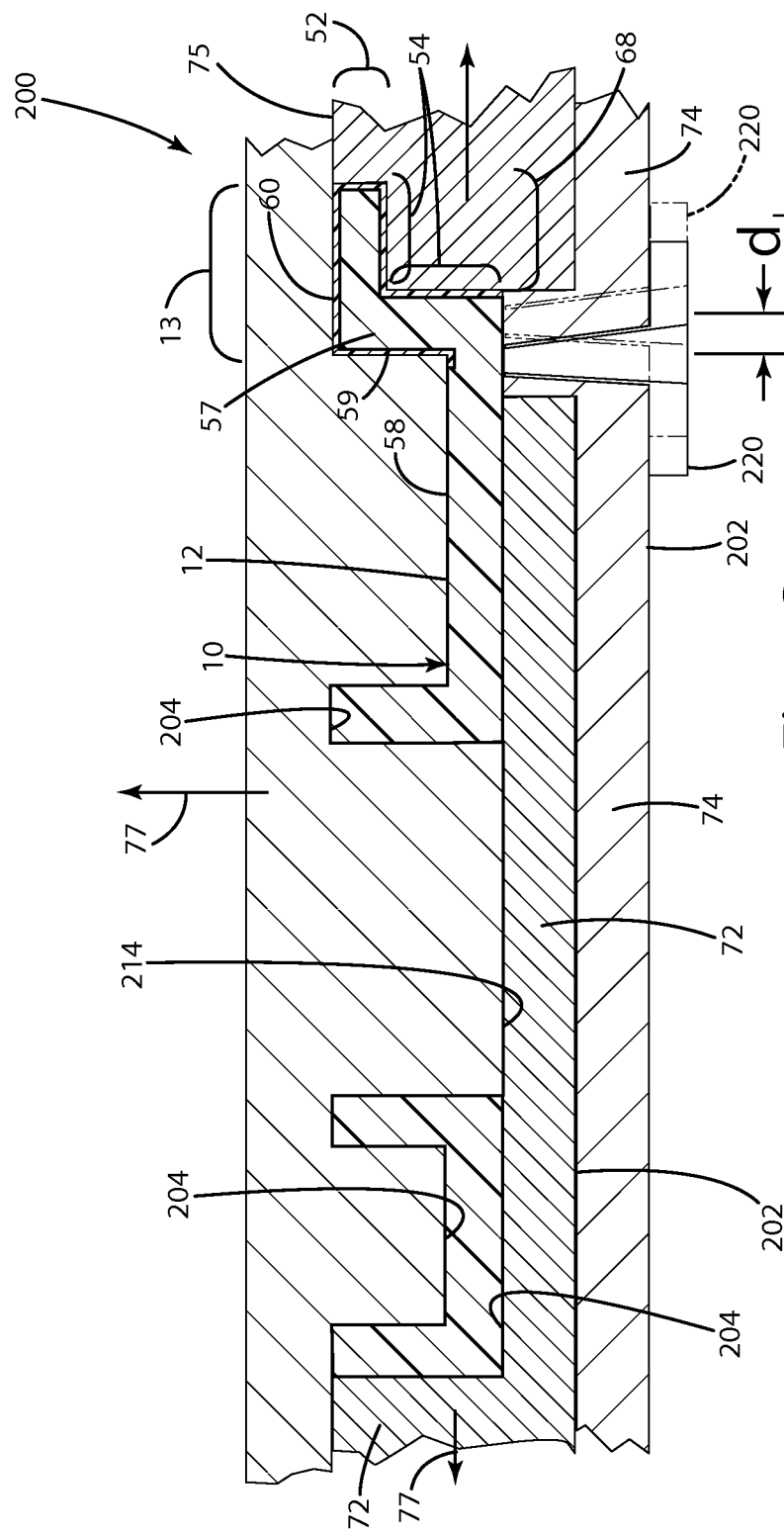

As illustrated in FIGS. 1, 3-5 and 7C, integral rail portion 12 and rail 13 includes a rear surface 56. In one non-limiting embodiment, rear surface 56 is defined by a planar surface that extends along a length and a width of the rail portion 12. In this embodiment, rear surface 56 is a parting surface as indicated by phantom line 75 between die portions 70 and 72, 70 and 73 and die portions 70 and 74 that define a first exemplary embodiment of an injection molding apparatus or injection molding die 200, as further described herein. The outwardly extending arrows 77 indicate the direction that the die portions are pulled in conjunction with the ejection of the window guiderail 10 once molding is complete, and in reverse the direction of movement of the die portions to assemble the molding die and associated die cavity. Generally speaking die portions 70, 72 and 73 define a three-part mold, with die portion 74 primarily associated with the translation of the molding die during molding of window guiderail 10, as described herein. At least one of die portion 70, die portion 72, and die portion 74 is movable and is translated in a direction orthogonal to the viewing plane, either into or out of the viewing plane. In the embodiment of FIGS. 1 and 7C, die portion 74 is stationary the die portion, and die portions 70 and 72 are moveable die portions, although they are stationary relative to one another. With this arrangement, there is great flexibility in the shape and complexity of the overall profile of window guiderail 10. It may have a substantially arcuate profile and include the desired rail portion 12, arm 22, 24 and hub-shaped motor mount 26, all while being molded using a moveable die arrangement. The design of the die portions and the associated cavity need only incorporate an interface along which the nozzles may be translated relative to the die cavity, such as a planar interface along which the nozzles may be translated relative to the die cavity. Generally, this translation may be done by associating the nozzle with a fixed die portion, such as by attachment of the nozzles to the fixed die portion as shown in FIGS. 6A-6F and 7A-7C. Alternately, nozzles may also be associated with a moveable die portion, or a plurality of die portions (not shown), such as by being fixed to one or more of the moveable die portions. In yet another alternative arrangement, the nozzles themselves may also be moveable relative to a fixed die portion or die portions, such as by associating the nozzles with a robotic arm or a numerically controlled table so that it may be separately translated relative to the fixed die portion or portions. The profile of the translation interface 78 and the translation path may be a curvilinear profile (i.e., a curved plane) as illustrated by the translation interface 78 incorporated into upper surface 80, as shown in phantom in the embodiment of FIG. 1

Figure 2:
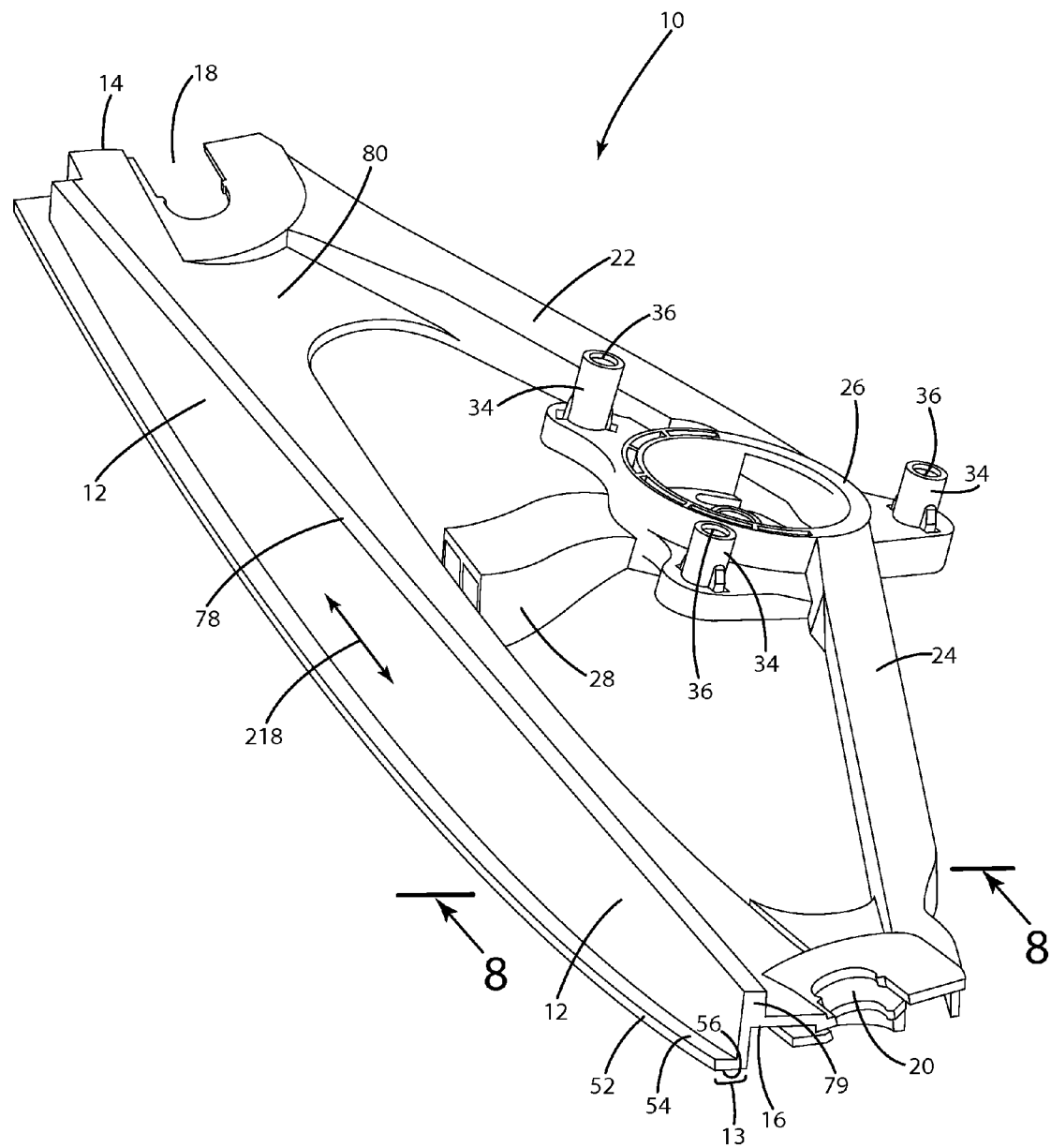
FIG. 2 is a top perspective view of a second exemplary embodiment of a window guide rail as disclosed herein.
Figure 3:
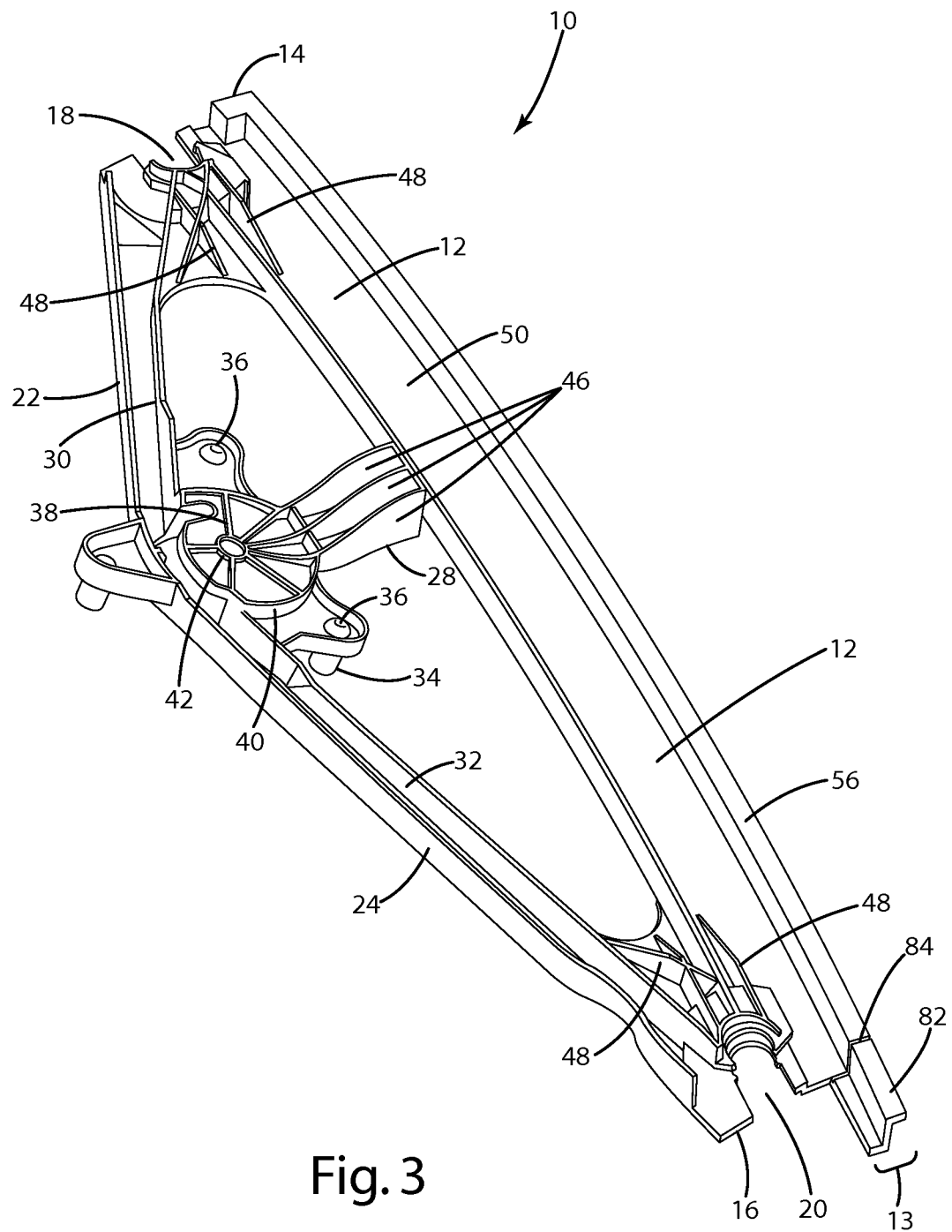
FIG. 3 is a bottom perspective view of the window guide rail of FIG. 1.
Figure 4:
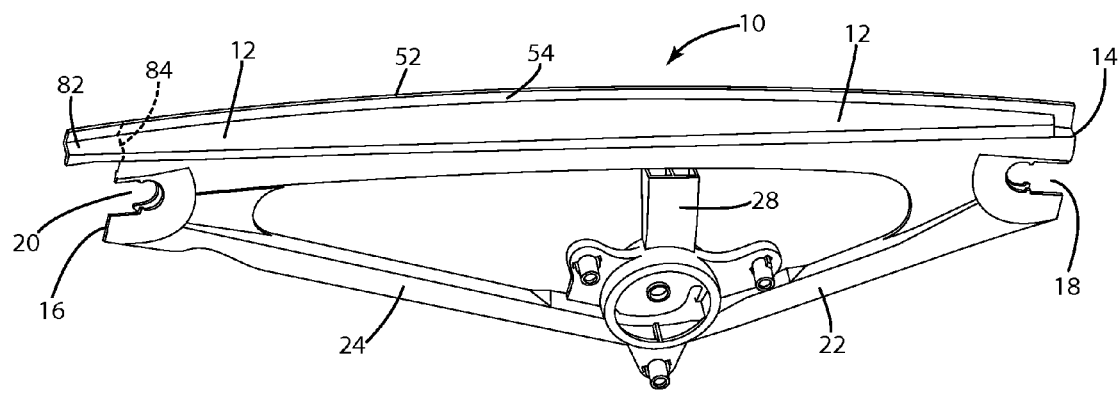
FIG. 4 is another top perspective view of the window guide rail of FIG. 1.
Figure 5:
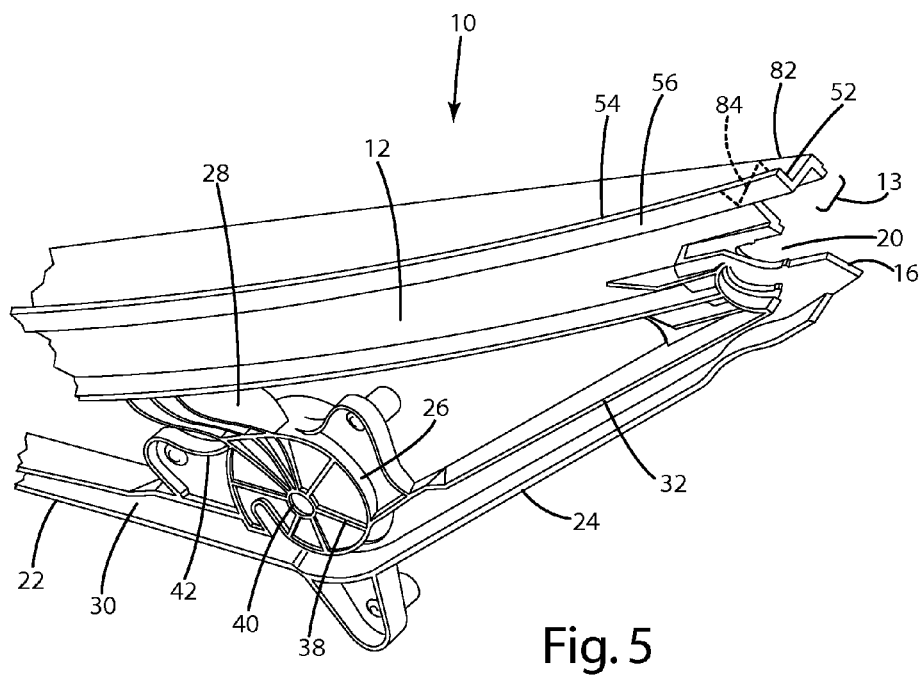
FIG. 5 is another bottom perspective view of the window guide rail of FIG. 1.
Figure 8:
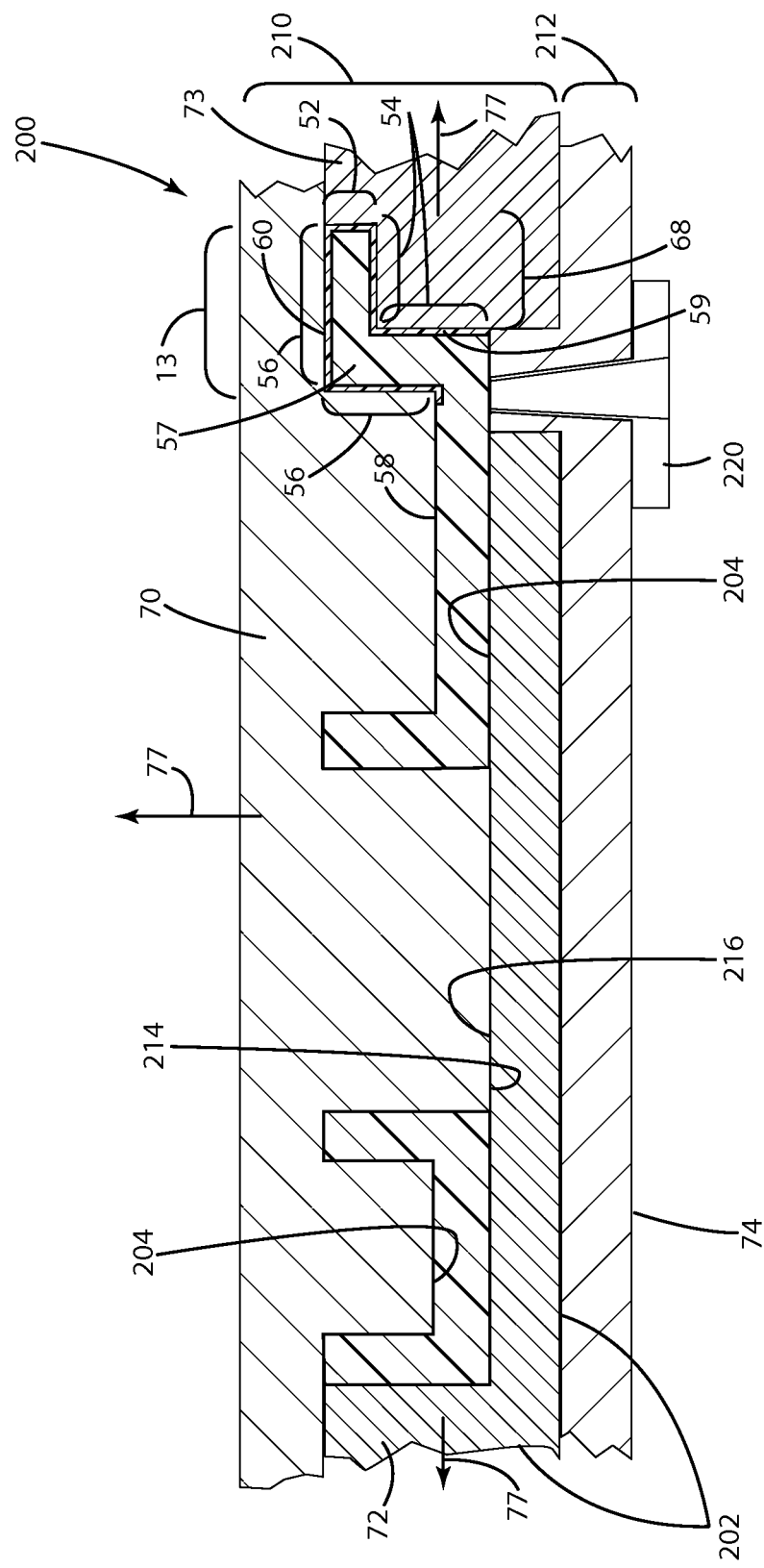
FIG. 8 is a cross-sectional view of the window guide rail of FIG. 2 taken along section 8-8.

Alternately, as illustrated in a second exemplary embodiment of window guiderail 10, the profile of the translation interface 78 and translation path may be a linear profile (i.e., a flat plane) as illustrated by the translation interface 78 incorporated into upper surface 80, as shown in FIG. 2. Translation interface 78 constitutes the upper surface of rib 79 that protrudes from upper surface 80 in the embodiment of FIG. 2. Rib 79 provides a flat plane that may be used as the injection interface during linear translation of the mold and mold cavity, as described herein. FIG. 8 illustrates an second exemplary molding die and die portions 70, 72 and 73 that provide a second exemplary embodiment of a molding apparatus 200, as described herein.

Referring to FIGS. 6A-6F and 7A-7C, and the description thereof herein, an exemplary embodiment of a method 100 of forming a multilayer window rail 10 that includes integral rail portion 12 and rail 13 having an outer edge 52, rail surface 54 and an opposing rear surface 56 is disclosed. Integral rail portion 12 includes a core 58 and integral rail cover layer 60 disposed on the core. Integral rail cover layer 60 includes a first polymer material core 58 includes a second polymer material.

Method 100 includes providing 110 an apparatus for molding 200. In an exemplary embodiment, apparatus 200 includes plurality of die portions referred to generally as die portions 202, and more particularly, as die portion 70, die portion 72 and die portion 74 (FIGS. 7A-7C), as described herein. Die portions 202 each include respective die cavity portions 204. The die cavity portions 204 include the surfaces in the respective die portions that are configured to define die cavity 206 having the shape of guiderail 10. As shown in the embodiments of FIGS. 7C and 8, the die cavity portions 204 and die cavity 206 are shown in a filled condition as occurs during molding 100. However, it will be understood that in an unfilled condition the die cavity 206 is defined by the respective die cavity portions 204. At least one of the die portions 202 is a slidable die portion 210 that is configured for movement during molding as described herein, it being understood that multiple die portions 202 may comprise slidable die portion 210 that are configured to be moved together during molding. This sliding movement may be accomplished using known mechanisms for translation of a die portion, such as the use of a numerically controlled translation table or a robot. At least one of die portions 202 is a fixed die portion 212 that is configured to maintain a fixed position during molding, as described herein. Multiple die portions 202 may comprise fixed die portion 212 that are configured to be stationary relative to the slidable die portion 210 during molding. Fixed die portion 212 may be fixed to a molding table (not shown) or a suitable jig (not shown) or fixture (not shown). Slidable die portion 210 has a sliding surface 214 that is configured for slidable, sealed engagement with a sliding surface 216 of fixed die portion 212, wherein the sliding surface 214 of the slidable die portion 210 is configured for sliding translation of its parting surface over the sliding surface 216 of the fixed die portion 212 along a translation path 218 (FIGS. 6B-6E). Translation path 218 may be a bi-directional path along which slidable mold portion 210 is translated in one direction during molding, and then reversed following ejection of the part prior to restarting molding 100 for another part. Alternately, it may be a unidirectional path along which slidable mold portion 210 is translated in one direction during molding and then returned by another path prior to ejection of the molded part and molding of the next window guiderail 10. One of the fixed die portion 212 or the slidable die portion 210 is configured to receive a first injection nozzle 220 and a second injection nozzle 222. First injection nozzle 220 is configured for injection of a first precursor polymer, i.e., the material from which integral rail cover layer 60 is formed. Second injection nozzle 222 is configured for injection of a second precursor polymer, i.e., the material from which core 58 is formed. First nozzle 220 is spaced from the second nozzle 222 along translation path 218. It may be axially spaced an axial distance ($d_A$) along the translation path, or it may be axially spaced an axial distance ($d_A$) along the translation path 218 and laterally offset by a lateral offset distance ($d_L$), as shown in FIGS. 6A and 7C, respectively. As shown in FIG. 1, translation path 218 may be a curvilinear path, such as an arc or radius of curvature. Alternately, as shown in FIG. 2, translation path 218 may be a linear path.

Method 100 also includes injecting 120 a first precursor of the first polymer material 59 into the die cavity 206. As used herein, first precursor material means the material from which the first polymer material 59 of integral rail cover layer 60 is formed. This may include a material that is not yet fully polymerized and that will become fully polymerized in conjunction with molding 100. Alternately, first precursor material may be fully polymerized and is simply heated above the glass transition or melting temperature in conjunction with molding, whereupon it resolidifies upon cooling during molding 100. Injecting 120 may be performed using conventional plastic injection molding equipment at conventional operating temperatures. However, injecting 120 may be performed at relatively lower injection molding pressures than are used in conventional plastic injection molding, as described herein.

Method 100 also includes translating 130 the slidable die portion 210 along the translation path 218 while injecting 120 the precursor of the first polymer material, wherein the first precursor polymer 59 forms integral rail cover layer 60. Translating 130 may be performed using any suitable translating mechanism, including fixing the slidable die portion 210 to a movable table or fixture. Suitable translating mechanisms include a numerically controlled table, robotic arm or the like that is configured for control of the translation by a computer. Since translating 130 may include translation along a linear or curvilinear translation path 218, the translating mechanism will be configured to provide the desired translation path 218.

Method 100 also includes injecting 140 a second precursor material 57 of the second polymer material into the die cavity 206 while translating 130 the slidable die portion 210, wherein the second precursor forms core 58. As used herein, second precursor material means the material from which the second polymer material 57 of core 58 is formed. This may include a material that is not yet fully polymerized and that will become fully polymerized in conjunction with molding 100. Alternately, first precursor material may be fully polymerized and is simply heated above the glass transition or melting temperature in conjunction with molding, whereupon it resolidifies upon cooling during molding 100. Injecting 140 may be performed using conventional plastic injection molding equipment at conventional operating temperatures. However, injecting 140 may be performed at relatively lower injection molding pressures than are used in conventional plastic injection molding, as described herein.

Method 100 also includes continuing 150 translating 130, injecting 120 and injecting 140 until the window guiderail 10 is formed. Cavity 206 is progressively filled and window guiderail 10 is progressively formed during translating 130, as shown in FIGS. 6B-6E. Injecting 120 ceases when nozzle 220 has filled the portion of cavity 206 associated with integral rail cover layer 60 and translating 130 carries the nozzle 220 past cavity 206. Injecting 140 ceases when nozzle 222 has filled the portion of cavity 206 associated with core 58 and translating 130 carries the nozzle 222 past cavity 206. Translating 130 ceases when cavity 206 is filled. Cavity 206 may also include a flashing cavity portion 208 that allows overfilling of the mold to ensure that cavity 206 is completely filled and window guiderail 10 is completely formed. This produces a window guiderail 10 that includes a flashing 82 on an end of rail portion 12, as illustrated, for example, in FIGS. 3-5 and 6F. Cavity 206 and flashing cavity portion 208 may be configured to produce a groove 84 that defines flashing 82 on window guiderail 10.

Method 100 also includes ejecting 160 the window guiderail and flashing 82 from cavity 206, including cavity flashing portion 208. Following ejecting 160, method 100 may also include deflashing 170 by applying a torsional force sufficient to sever flashing 82 along groove 84.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multilayer window guiderail, comprising:
   a rail portion having an outer edge positioned between a rail surface and an opposing rear surface, the rail portion being further defined by a core having an exterior surface covered with an integrally formed rail cover layer disposed on the exterior surface of the core, wherein the core is a first filled polymer material and the rail cover layer includes a second unfilled polymer material and wherein the first filled polymer material has a first coefficient of friction ($\mu_1$) and the second unfilled polymer material has a second coefficient of friction ($\mu_2$), and wherein $\mu_1 > \mu_2$, wherein the core comprising the first filled polymer material and the rail cover layer comprising the second unfilled polymer material are integrally formed to each other in an injection molding die, with a first injection nozzle and a second injection nozzle, the first injection nozzle configured for injection of the second unfilled polymer material, the second injection nozzle configured for injection of the first filled polymer material, and
   wherein the first injection nozzle has a first lateral spacing from a surface of the injection molding die defining the outer edge of the rail portion and the second injection nozzle has a second lateral spacing from said surface of the injection molding die defining the outer edge, and wherein the first lateral spacing is less than or equal to the second lateral spacing.

2. The window guiderail of claim 1, wherein the rail portion further comprises a guide channel located on the rail surface.

3. The window guiderail of claim 2, wherein the guide channel is substantially L-shaped.

4. The window guiderail of claim 1, wherein the opposing rear surface is defined by a planar guide surface that extends along a length and a width of the rail portion.

5. The window guiderail of claim 1, wherein the first filled polymer comprises nylon, polypropylene, or polyester.

6. The window guiderail of claim 5, wherein the second unfilled polymer comprises nylon, polyester, or acetal.

7. The window guiderail of claim 1, wherein the second unfilled polymer comprises nylon, polyester, or acetal.

8. The window guiderail of claim 7, wherein the second unfilled polymer further comprises a slip coat agent.

9. The window guiderail of claim 1, wherein the rail cover layer defines the rail surface.

10. The window guiderail of claim 9, wherein the rail cover layer defines the outer edge, rear surface, or a combination thereof.

11. The window guiderail of claim 1, further comprising a first arm attached to and extending between a first end of the rail portion and a motor mount and a second arm attached to and extending between a second end of the rail portion and the motor mount.

* * * * *